US010423379B2

(12) United States Patent
Li (10) Patent No.: US 10,423,379 B2
(45) Date of Patent: Sep. 24, 2019

(54) METHOD AND DEVICE FOR SCREEN-OFF DISPLAY

(71) Applicant: Beijing Xiaomi Mobile Software Co., Ltd., Haidian District, Beijing (CN)

(72) Inventor: Guosheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 0 days.

(21) Appl. No.: 15/874,848

(22) Filed: Jan. 18, 2018

(65) Prior Publication Data

US 2018/0335997 A1    Nov. 22, 2018

(30) Foreign Application Priority Data

May 5, 2017  (WO) ................ PCT/CN2017/085345

(51) Int. Cl.
 *G09G 3/20*  (2006.01)
 *G06F 3/14*  (2006.01)
 *G06F 1/3234*  (2019.01)

(52) U.S. Cl.
 CPC .......... *G06F 3/1423* (2013.01); *G06F 1/3265* (2013.01); *G09G 3/20* (2013.01);
 (Continued)

(58) Field of Classification Search
 CPC ........... G09G 3/22–38; G09G 2310/04; G09G 2330/021
 See application file for complete search history.

(56) References Cited

U.S. PATENT DOCUMENTS 9,401,130 B2   7/2016 Gunn et al.
2011/0089926 A1  4/2011 Kim
(Continued)

FOREIGN PATENT DOCUMENTS

CN  104954558 A  9/2015
CN  105892618 A  8/2016
(Continued)

OTHER PUBLICATIONS

The Extended European Search Report in European application No. 18154687.0, dated Aug. 7, 2018.
(Continued)

*Primary Examiner* — Michael Pervan
(74) *Attorney, Agent, or Firm* — Jun He Law Offices P.C.; James J. Zhu (57) ABSTRACT

A method and device for screen-off display in the field of information processing are disclosed. A content element for screen-off display and format information corresponding to information content to be displayed via screen-off display are acquired. A reference time is acquired. The reference time refers to a system time acquired by an Application Processor (AP) at turnoff of a screen. The information content is displayed via screen-off display according to the reference time, the format information, and the content element for screen-off display. With embodiments herein, after the screen goes off, display is done straightforwardly according to the reference time, the format information, and the required content element, without the need to awaken the AP every minute to acquire an instant time, or to do plotting every minute according to the acquired instant time, thereby reducing power consumption.

14 Claims, 8 Drawing Sheets

(52) U.S. Cl.
CPC ....... *G09G 3/2096* (2013.01); *G09G 2310/04* (2013.01); *G09G 2310/08* (2013.01); *G09G 2330/021* (2013.01); *G09G 2354/00* (2013.01); *G09G 2360/02* (2013.01); *G09G 2360/04* (2013.01); *Y02D 10/153* (2018.01)

(56) References Cited

U.S. PATENT DOCUMENTS

| | | |
|---|---|---|
| 2014/0118272 A1 | 5/2014 | Gunn |
| 2014/0120988 A1 | 5/2014 | Gunn et al. |
| 2014/0122911 A1 | 5/2014 | Gunn et al. |
| 2014/0274217 A1* | 9/2014 | Lee .................. H04M 1/0266 455/566 |
| 2015/0022471 A1* | 1/2015 | Kwak .................. G06F 1/3265 345/173 |
| 2015/0057052 A1 | 2/2015 | Eo et al. |
| 2015/0106637 A1 | 4/2015 | Zhang et al. |
| 2015/0325213 A1 | 11/2015 | Lee et al. |
| 2016/0049106 A1 | 2/2016 | Connell et al. |
| 2016/0116598 A1* | 4/2016 | Wu .................. G01S 19/23 342/357.62 |
| 2016/0155426 A1 | 6/2016 | Gunn et al. |
| 2016/0209907 A1 | 7/2016 | Han et al. |
| 2016/0309307 A1 | 10/2016 | Agarwal et al. |
| 2017/0221451 A1 | 8/2017 | Connell et al. |

FOREIGN PATENT DOCUMENTS

| | | |
|---|---|---|
| CN | 106095473 A | 11/2016 |
| CN | 106354368 A | 1/2017 |
| EP | 3037913 A1 | 6/2016 |
| JP | 2004288087 A | 10/2004 |
| JP | 2007017161 A | 1/2007 |
| JP | 2013114452 A | 6/2013 |
| JP | 2014102836 A | 6/2014 |
| JP | 2016081365 A | 5/2016 |
| JP | 2016126572 A | 7/2016 |
| JP | 2016186811 A | 10/2016 |
| JP | 2017076257 A | 4/2017 |
| RU | 2535582 C2 | 12/2014 |
| WO | 2012177391 A2 | 12/2012 |
| WO | 2016025393 A1 | 2/2016 |

OTHER PUBLICATIONS

International Search Report in international application No. PCT/CN2017/085345, dated Feb. 26, 2018.
The Written Opinion of the International Search Authority in international application No. PCT/CN2017/085345, dated Feb. 26, 2018.
English Translation of the Notification of the First Office Action of Russian application No. 2018117723, dated Feb. 13, 2019.

* cited by examiner

METHOD AND DEVICE FOR SCREEN-OFF DISPLAY

CROSS-REFERENCE TO RELATED APPLICATIONS

This application claims priority to Chinese patent application PCT/CN2017/085345 filed on May 22, 2017, the entire content of which is incorporated herein by reference.

TECHNICAL FIELD

The present disclosure generally relates to the field of information processing, and in particular to a method and device for screen-off display.

BACKGROUND

With wide use of intelligent terminals such as smartphones and tablet computers, users depend more and more on intelligent terminals. According to statistics, a user views a smartphone on a daily basis by turning on a screen approximately 150 times, mostly to view time and any notification message. Therefore, a method for screen-off display has been provided as follows to facilitate acquisition of time and a notification message by a user.

In related art, an intelligent terminal may only keep part of a screen on to display time and a notification message. The intelligent terminal may acquire instant time every minute through an Application Processor (AP), plot, according to the acquired instant time and a preset display format, a picture to be displayed, and then display the picture.

SUMMARY

According to a first aspect herein, a method for screen-off display includes:

acquiring a content element for screen-off display and format information corresponding to information content to be displayed via screen-off display;

acquiring a reference time, wherein the reference time refers to a system time acquired by an Application Processor (AP) at turnoff of a screen; and displaying the information content via screen-off display according to the reference time, the format information, and the content element for screen-off display.

According to a second aspect herein, a device for screen-off display includes:

a processor; and a memory for storing instructions executable for the processor.

The processor is configured for:

acquiring a content element for screen-off display and format information corresponding to information content to be displayed via screen-off display;

acquiring a reference time, wherein the reference time refers to a system time acquired by an Application Processor (AP) at turnoff of a screen; and displaying the information content via screen-off display according to the reference time, the format information, and the content element for screen-off display.

According to a third aspect herein, a non-transitory computer-readable storage medium has stored therein instructions that when executed by a processor, causes the processor to perform a method for screen-off display according to the first aspect herein.

Noted that the above general description and elaboration below are merely exemplary and explanatory, and do not limit the present disclosure.

BRIEF DESCRIPTION OF THE DRAWINGS

Drawings incorporated herein constitute part of the disclosure, illustrate embodiments according to the present disclosure, and together with the disclosure, serve to explain the principle of the present disclosure.

DETAILED DESCRIPTION

Exemplary embodiments (examples of which are illustrated in the accompanying drawings) are elaborated below. The following description refers to the accompanying drawings in which identical or similar elements in two drawings are denoted by identical reference numerals unless indicated otherwise. The exemplary implementation modes may take on multiple forms, and should not be taken as being limited to examples illustrated herein. Instead, by providing such implementation modes, embodiments herein may become more comprehensive and complete, and comprehensive concept of the exemplary implementation modes may be delivered to those skilled in the art. Implementations set forth in the following exemplary embodiments do not represent all implementations in accordance with the present disclosure. Rather, they are merely examples of the device and method in accordance with certain aspects herein as recited in the accompanying claims.

A term used in an embodiment herein is merely for describing the embodiment instead of limiting the present disclosure. A singular form "a" and "the" used in an embodiment herein and the appended claims may also be intended to include a plural form, unless clearly indicated otherwise by context. Further note that a term "and/or" used herein may refer to and contain any combination or all possible combinations of one or more associated listed items.

Note that although a term such as first, second, third may be adopted in an embodiment herein to describe various kinds of information, such information should not be limited to such a term. Such a term is merely for distinguishing information of the same type. For example, without departing from the scope of the embodiments herein, the first information may also be referred to as the second information. Similarly, the second information may also be referred to as the first information. Depending on the context, a "if" as used herein may be interpreted as "when" or "while" or "in response to determining that".

In addition, described characteristics, structures or features may be combined in one or more implementation modes in any proper manner. In the following descriptions, many details are provided to allow a full understanding of embodiments herein. However, those skilled in the art will know that the technical solutions of embodiments herein may be carried out without one or more of the details; alternatively, another method, component, device, step, etc. may be adopted. Under other conditions, no detail of a known structure, method, device, implementation, material or operation may be shown or described to avoid obscuring aspects of embodiments herein.

A block diagram shown in the accompanying drawings may be a functional entity which may not necessarily correspond to a physically or logically independent entity. Such a functional entity may be implemented in form of software, in one or more hardware modules or integrated circuits, or in different networks and/or processor devices and/or microcontroller devices.

Before an embodiment herein is elaborated, a scene where an embodiment herein may apply will be introduced. At present, intelligent terminals such as smartphones and tablet computers are widely used in everyday life. A user may acquire various kinds of information via an intelligent terminal. When not using the intelligent terminal, the user may turn off the screen of the intelligent terminal by operating a specified button. While the screen of the intelligent terminal is in an off state, the user may wish to acquire a current time via the intelligent terminal. A notification message may be received at the intelligent terminal while the screen of the intelligent terminal is in the off state. The user may wish to view the notification message. A method for screen-off display according to an embodiment herein may apply to such a scene. With the method for screen-off display according to an embodiment herein, while the screen of an intelligent terminal is off, time, a notification message, etc. may be displayed by the intelligent terminal by keeping part of the screen on, so as to allow the user to view anytime.

In related art, during screen-off display, an intelligent terminal may have to acquire instant time by awakening an AP every minute and to plot, in real time according to the acquired instant time and a preset display format, a picture to be displayed, causing high power consumption by the intelligent terminal for screen-off display.

To this end, embodiments herein provide a method for screen-off display. The method is elaborated below with reference to the drawings and the following embodiments.

Figure 1:
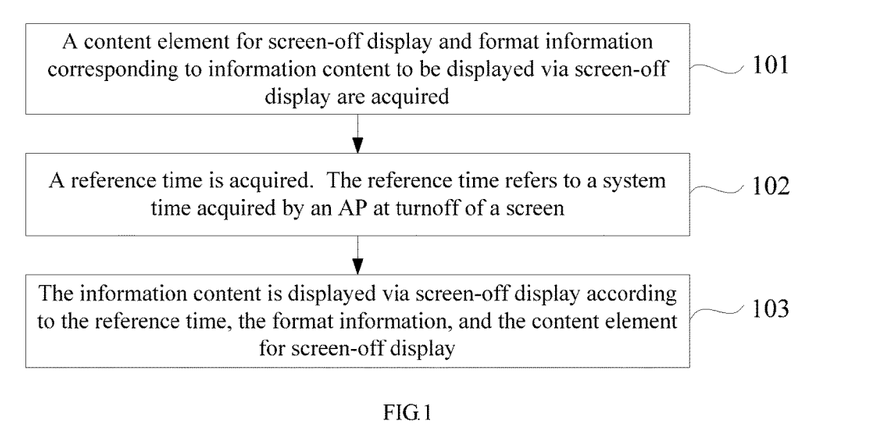
FIG. 1 is a flowchart of a method for screen-off display according to an exemplary embodiment herein.

FIG. 1 is a flowchart of a method for screen-off display according to an exemplary embodiment herein. As shown in FIG. 1, the method for screen-off display applies to an intelligent terminal. The method includes steps as follows.

In Step 101, a content element for screen-off display and format information corresponding to information content to be displayed via screen-off display are acquired.

In Step 102, a reference time is acquired. The reference time refers to a system time acquired by an AP at turnoff of a screen.

In Step 103, the information content is displayed via screen-off display according to the reference time, the format information, and the content element for screen-off display.

The information content may be displayed via screen-off display according to the reference time, the format information, and the content element for screen-off display, as follows.

A time duration elapsed since the acquisition of the reference time may be acquired, by starting timing at the acquisition of the reference time.

An instant system time may be acquired as a sum of the reference time and the time duration elapsed since the acquisition of the reference time.

The instant system time may be displayed via screen-off display according to the format information and the content element for screen-off display.

The instant system time may be displayed via screen-off display according to the format information and the content element for screen-off display as follows.

A content element corresponding to the instant system time may be acquired from the content element for screen-off display.

The content element corresponding to the instant system time as acquired may be displayed according to the format information.

The method may further include steps as follows after the acquisition of the reference time A system time acquired by the AP may be acquired at a preset interval.

The reference time may be updated with the acquired system time. Timing may be restarted at the update of the reference time.

The information content may be displayed via screen-off display according to the reference time, the format information, and the content element for screen-off display, as follows.

In response to receiving a notification message, a message type of the notification message may be determined. The notification message may be configured for prompting reception of new information.

A content element corresponding to the message type of the notification message may be acquired from the content element for screen-off display.

The notification message may be displayed via screen-off display according to the reference time, the format information, and the content element corresponding to the message type of the notification message.

The notification message may be displayed via screen-off display according to the reference time, the format information, and the content element corresponding to the message type of the notification message as follows.

A receipt time of receiving the notification message may be determined according to the reference time.

Message content of the notification message and the receipt time of receiving the notification message may be displayed via screen-off display according to the format information and any acquired content element, including that corresponding to the message type of the notification message.

An embodiment herein may be formed by any combination of above optional solutions, which will not be elaborated one by one here.

There may be two types of information content to be displayed by an intelligent terminal via screen-off display, namely time and a notification message. The intelligent terminal may only display the time. The intelligent terminal may only display the notification message. The intelligent terminal may display both the time and the notification message at the same time. The intelligent terminal may display different types of information content in different modes of screen-off display. The respective modes of screen-off display in which the time and the notification message are displayed are elaborated below respectively with reference to the drawings.

Figure 2:
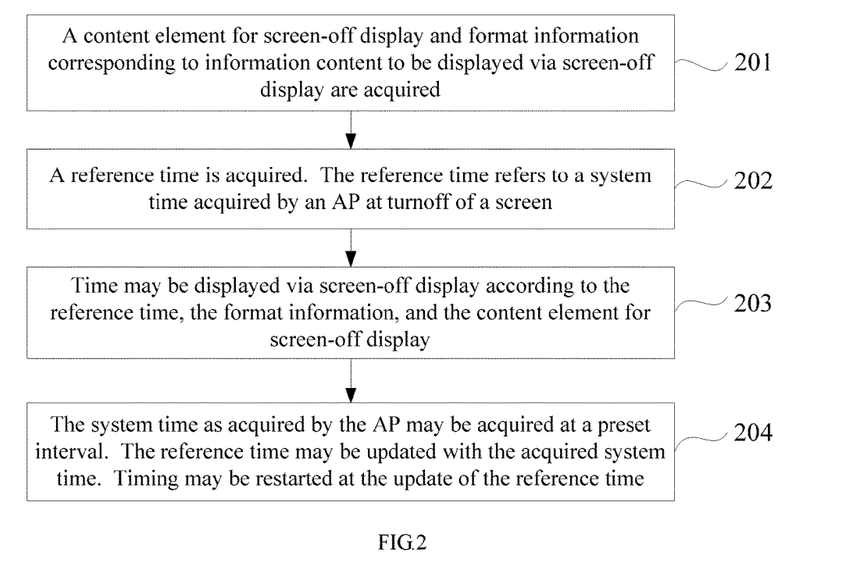
FIG. 2 is a flowchart of a method for screen-off display according to an exemplary embodiment herein.

The mode of/method for screen-off display of the time according to an embodiment herein is described below with reference to FIG. 2. FIG. 2 is a flowchart of a method for screen-off display according to an exemplary embodiment herein. As shown in FIG. 2, the method includes steps as follows.

In Step 201, a content element for screen-off display and format information corresponding to information content to be displayed via screen-off display are acquired.

An intelligent terminal generally includes an AP and a Display Driver Integrated Circuit (DDIC). An intelligent terminal integrating touch and display may include, in place of the DDIC, a Touch Display Driver Integration (TDDI). In related art, to perform screen-off display with the screen in the off state, the AP of an intelligent terminal may acquire a system time. The system time is an instant time, i.e., an accurate current time. The AP may then plot a picture in real time using the acquired system time. The intelligent terminal has to acquire the system time by awakening the AP and perform real-time plotting every minute, causing high power consumption by the intelligent terminal.

In an embodiment herein, upon detecting activation of screen-off display, an intelligent terminal may store, in the DDIC or the TDDI, the content element for screen-off display and the format information corresponding to the information content to be displayed via screen-off display. Thereby, during screen-off display after the screen goes off, the intelligent terminal may display the information content straightforwardly according to the format information and the content element stored in the DDIC or the TDDI, without the need to awaken the AP to do real-time plotting, thereby reducing power consumption thereof. Screen-off display implemented via the DDIC is described in the embodiment. When the intelligent terminal includes the TDDI, screen-off display via the TDDI is the same as that via the DDIC, and will not be introduced separately here.

Note that the information content to be displayed via screen-off display and/or the corresponding format information may be set or selected by a user using the intelligent terminal. The intelligent terminal may determine the content element for screen-off display according to the information content selected by the user. The format information and/or the content element for screen-off display may also be format information and/or any content element in the intelligent terminal by default.

For example, in case the user only wants to display the time via screen-off display, the user may select, through the intelligent terminal, to only display the time and format information for time display. The intelligent terminal may then determine, according to the information content to be displayed and the format information as selected by the user, a content element required to display the time in the selected format information, and store the format information and the determined content element into the DDIC of the intelligent terminal.

Also note that the content element for screen-off display may include content elements such as 0-9, a-z, A-Z, A.M., P.M., day, date, month, year, and/or the like. Such a content element may be picture data or original picture data with redundant data removed. To save storage space, the intelligent terminal may compress the format information and the any content element for screen-off display and then store the compressed data in the DDIC.

In Step 202, a reference time is acquired. The reference time refers to a system time acquired by an AP at turnoff of a screen.

After acquiring the format information and the content element for screen-off display, the DDIC of the intelligent terminal cannot acquire a system time during screen-off display. When the intelligent terminal detects that the screen goes off or darkens, the AP of the intelligent terminal may acquire the system time and output the acquired system time to the DDIC of the intelligent terminal. The DDIC of the intelligent terminal may set the system time as the reference time and display the information content with a method introduced below.

Note that the reference time output to the DDIC by the AP of the intelligent terminal may include not only hour, minute, and second, but also include time information of A.M. or P.M., date information of year, month, date, etc.

In Step 203, time may be displayed via screen-off display according to the reference time, the format information, and the content element for screen-off display.

After acquiring the format information, the content element, and the reference time, the DDIC of the intelligent terminal may acquire a time duration elapsed by starting timing at the acquisition of the reference time. The DDIC may acquire an instant system time as a sum of the reference time and the time duration elapsed. The DDIC may display the instant system time via screen-off display according to the format information and the content element for screen-off display. The time duration elapsed may indicate time duration elapsed since the acquisition of the reference time.

The DDIC of the intelligent terminal may perform timing using a crystal oscillator thereof. The DDIC may start timing upon acquisition of the reference time. In such a manner, when an instant system time is to be displayed, the DDIC may acquire the time duration elapsed since the acquisition of the reference time. The DDIC may acquire the instant system time as the reference time plus the time duration elapsed since the acquisition of the reference time.

Having acquired the instant system time, the DDIC may acquire, from the any content element for screen-off display, a content element corresponding to the instant system time; and display the acquired content element according to the format information.

Note that as the content element for screen-off display and/or the format information are stored in the DDIC. Having acquired the instant system time, the DDIC may acquire, from the any stored content element, any content element required for displaying the instant system time straightforwardly, and display the instant system time according to the any content element acquired and the stored format information. In such a manner, the intelligent terminal does not have to awaken the AP to acquire the instant system time or to perform real-time plotting according to the instant system time, thereby reducing the power consumption by the intelligent terminal.

For example, assume that a reference time of 9:00 has been acquired, the DDIC may start timing at 9:00. After one minute, the DDIC may acquire a time duration elapsed of 1 minute. The DDIC may acquire the instant system time of 9:01 by adding one minute to 9:00. The DDIC may acquire 9, 0 and 1 from the any stored content element according to the instant system time, and display the instant system time as 9:01 according to the stored format information.

When the reference time acquired by the DDIC further include information such as A.M. or P.M., year, month, date, etc., the DDIC may further determine whether it is in the morning or in the afternoon according to the instant system time, and acquire a content element for indicating A.M. or P.M. The DDIC may acquire and display a content element corresponding to acquired date information of year, month, date. When the instant system time of 00:00 is detected, the DDIC may add one day to the date information of year, month, date in the acquired reference time. Alternatively, when detecting 00:00, the intelligent terminal may automatically awaken the AP to acquire the system time and update the reference time with the acquired system time.

In Step 204, a system time as acquired by the AP may be acquired at a preset interval. The reference time may be updated with the acquired system time. Timing may be restarted at the update of the reference time.

Timing may be performed using the crystal oscillator of the DDIC. There may be an error due to insufficient accuracy in timing by the crystal oscillator. An error accumulated during long-term screen-off display may impact accuracy of the acquired time duration elapsed as well as precision of the computed instant system time. To avoid excessive deviation of the instant system time caused by excessive error accumulation, the intelligent terminal may awaken the AP to acquire an accurate system time at a preset interval and update the DDIC with the acquired accurate system time. Having acquired the updated system time, the DDIC may update the stored reference time with the acquired system time and restart timing at the update of the reference time to acquire the time duration elapsed.

The preset interval may be set according to a property of the crystal oscillator of the DDIC. A small preset interval may be set if the crystal oscillator of the DDIC produces a significant timing error. Otherwise a large preset interval may be set. For example, the preset interval may be 3 hours or 10 hours, which is not limited herein.

In the embodiment herein, the DDIC of an intelligent terminal may acquire a content element for screen-off display and format information corresponding to information content to be displayed via screen-off display, as is preset, as well as an accurate reference time acquired by the AP at turnoff of the screen. Thus, after the screen of the intelligent terminal goes off, the DDIC may perform timing using the crystal oscillator thereof and compute the instant system time, without the need to awaken the AP every minute to acquire the instant system time, reducing system power consumption. Having computed the instant system time, the DDIC may determine, from any acquired content element, any content element required for display and perform display according to the any determined content element and the format information. The intelligent terminal does not have to awaken the AP to do real-time plotting, further reducing the system power consumption.

Figure 3:
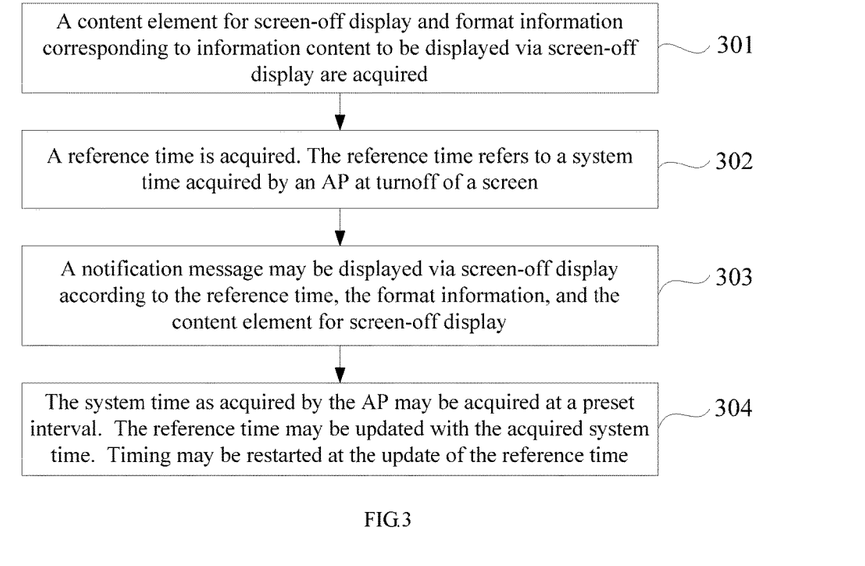
FIG. 3 is a flowchart of a method for screen-off display according to an exemplary embodiment herein.

In the above embodiment, screen-off time display is introduced with reference to FIG. 2. Screen-off display of a notification message is elaborated below with reference to FIG. 3. FIG. 3 is a flowchart of a method for screen-off display according to an exemplary embodiment herein. The method applies to an intelligent terminal. As shown in FIG. 3, the method may include steps as follows.

In Step 301, a content element for screen-off display and format information corresponding to information content to be displayed via screen-off display are acquired.

The step may be implemented with reference to implementation of Step 201. Note that when the information content to be displayed via screen-off display as selected by a user includes a notification message, the content element for screen-off display as stored in the DDIC by the intelligent terminal may further include a content element such as an icon for notifying a phone call, a short message, a common application, etc.

In Step 302, a reference time is acquired. The reference time refers to a system time acquired by an AP at turnoff of a screen.

The step may be implemented with reference to implementation of Step 202, which will not be repeated here.

In Step 303, a notification message may be displayed via screen-off display according to the reference time, the format information, and the content element for screen-off display.

Having acquired the format information, the content element and the reference time, upon receiving the notification message, the intelligent terminal may determine a message type of the notification message. The notification message may be configured for prompting reception of new information. The intelligent terminal may acquire, from the content element for screen-off display, a content element corresponding to the message type of the notification message. The intelligent terminal may display the notification message via screen-off display according to the reference time, the format information, and the acquired content element. The new information may be information received after the reference time or unread information. The new information may be information received after the screen of the intelligent terminal goes off, or information that has been received before the screen of the intelligent terminal goes off but is yet to be read.

During screen-off display, upon receiving new information, the intelligent terminal may generate a notification message according to the new information, and transmit the notification message to the DDIC. Upon receiving the notification message, the DDIC may determine the message type of the notification message. The DDIC may acquire, from the stored content element, the content element corresponding to the message type of the notification message. The DDIC may display the acquired content element according to the format information.

For example, upon receiving a new short message, the intelligent terminal may generate a short message notification message according to the new short message. The message type of the notification message may be of a short message. The intelligent terminal may transmit the short message notification message to the DDIC. The DDIC may acquire an icon for notifying the short message from the any stored content element, and display the icon for notifying the short message according to the format information.

Upon receiving a notification message, the DDIC may determine a receipt time of receiving the notification message according to the reference time. The DDIC may display message content of the notification message and the receipt time of receiving the notification message via screen-off display according to the format information and the acquired content element.

Upon receiving the notification message, the DDIC may acquire the receipt time of receiving the notification message, by determining a time duration elapsed since the acquisition of the reference time till reception of the notification message and adding the time duration elapsed to the reference time. The DDIC may acquire, from the any stored content element according to the message type of the received notification message, a notifying icon corresponding to the received notification message. The DDIC may then display, according to the format information, the receipt time of receiving the notification message, the message content of the notification message and the notifying icon corresponding to the notification message.

In Step 304, the system time as acquired by the AP may be acquired at a preset interval. The reference time may be updated with the acquired system time. Timing may be restarted at the update of the reference time.

Refer to implementation of Step 202 for that of the above step, which will not be repeated here.

In the embodiment, having received a new information, the intelligent terminal may generate a notification message according to the new information. The intelligent terminal may transmit the notification message to the DDIC. The DDIC may determine the message type of the notification message. The DDIC may acquire straightforwardly, from the any stored content element, the notifying icon corresponding to the message type. The DDIC may then display the notifying icon according to the stored format information. That is, during screen-off display of the notification message, a content element corresponding to the message type of the notification message may be acquired and displayed straightforwardly, without the need for the AP of the intelligent terminal to do real-time plotting according to the notification message, thereby reducing power consumption.

Note that, during screen-off display, the intelligent terminal may display time or a notification message only, or display both time and a notification message at the same time. Refer to both an above embodiment for displaying time and an above embodiment for displaying a notification message to display both time and a notification message at the same time by combining the steps thereof.

A device according to an embodiment herein is described below with reference to the method according to an embodiment herein.

Figure 4A:
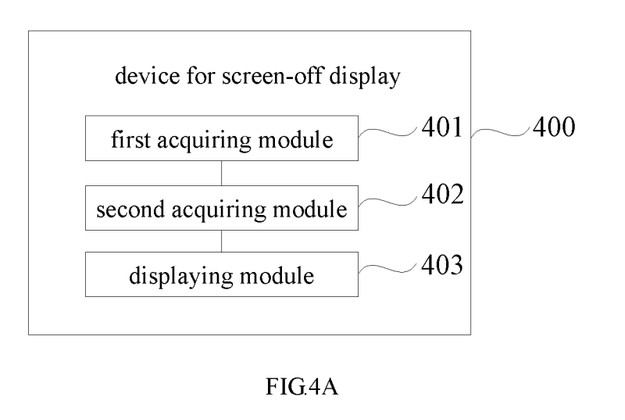
FIG. 4A is a block diagram of a device for screen-off display according to an exemplary embodiment herein.

FIG. 4A is a block diagram of a device for screen-off display 400 according to an exemplary embodiment herein. Referring to FIG. 4A, the device includes a first acquiring module 401, a second acquiring module 402, and a displaying module 403.

The first acquiring module 401 is configured for acquiring a content element for screen-off display and format information corresponding to information content to be displayed via screen-off display.

The second acquiring module 402 is configured for acquiring a reference time. The reference time refers to a system time acquired by an Application Processor (AP) at turnoff of a screen.

The displaying module 403 is configured for displaying the information content via screen-off display according to the reference time, the format information, and the content element for screen-off display.

Figure 4B:
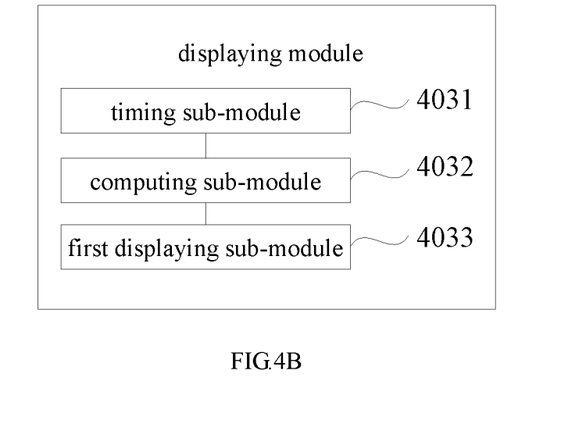
FIG. 4B is a block diagram of a displaying module according to an exemplary embodiment herein.

Referring to FIG. 4B, the displaying module 403 may include a timing sub-module 4031, a computing sub-module 4032, and a first displaying sub-module 4033.

The timing sub-module 4031 may be configured for acquiring a time duration elapsed since the acquisition of the reference time, by starting timing at the acquisition of the reference time.

The computing sub-module 4032 may be configured for acquiring an instant system time as a sum of the reference time and the time duration elapsed since the acquisition of the reference time.

The first displaying sub-module 4033 may be configured for displaying the instant system time via screen-off display according to the format information and the content element for screen-off display.

The first displaying sub-module 4033 may be configured for acquiring, from the content element for screen-off display, a content element corresponding to the instant system time, and displaying the content element corresponding to the instant system time according to the format information.

Figure 4C:
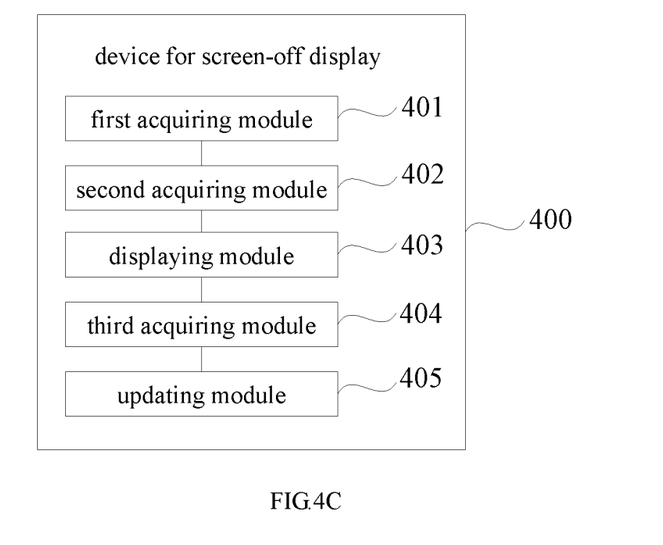
FIG. 4C is a block diagram of a device for screen-off display according to an exemplary embodiment herein.

Referring to FIG. 4C, the device 400 may further include a third acquiring module 404 and an updating module 405.

The third acquiring module 404 may be configured for acquiring a system time acquired by the AP at a preset interval.

The updating module 405 may be configured for updating the reference time with the acquired system time, and restarting timing at the update of the reference time.

Figure 4D:
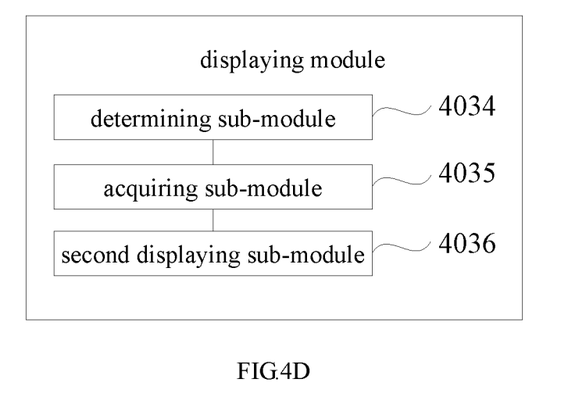
FIG. 4D is a block diagram of a displaying module according to an exemplary embodiment herein.

Referring to FIG. 4D, the displaying module 403 may include a determining sub-module 4034, acquiring sub-module 4035, and a second displaying sub-module 4036.

The determining sub-module 4034 may be configured for, in response to receiving a notification message prompting reception of new information, determining a message type of the notification message.

The acquiring sub-module 4035 may be configured for acquiring, from the content element for screen-off display, a content element corresponding to the message type of the notification message.

The second displaying sub-module 4036 may be configured for displaying the notification message via screen-off display according to the reference time, the format information, and the content element corresponding to the message type of the notification message.

The second displaying sub-module 4036 may be configured for determining a receipt time of receiving the notification message according to the reference time, and displaying message content of the notification message and the receipt time of receiving the notification message via screen-off display according to the format information and the content element corresponding to the message type of the notification message.

In the embodiment herein, the DDIC of an intelligent terminal may acquire a content element for screen-off display and format information corresponding to information content to be displayed via screen-off display, as is preset, as well as an accurate reference time acquired by the AP at turnoff of the screen. Thus, after the screen of the intelligent terminal goes off, the DDIC may perform timing using the crystal oscillator thereof and compute the instant system time, without the need to awaken the AP every minute to acquire the instant system time, reducing system power consumption. Having computed the instant system time, the DDIC may determine, from any acquired content element, any content element required for display and perform display according to the any determined content element and the format information. The intelligent terminal does not have to awaken the AP to do real-time plotting, further reducing the system power consumption.

In the embodiment, having received new information, the intelligent terminal may generate a notification message according to the new information. The intelligent terminal may transmit the notification message to the DDIC. The DDIC may determine the message type of the notification message. The DDIC may acquire straightforwardly, from the any stored content element, the notifying icon corresponding to the message type. The DDIC may then display the notifying icon according to the stored format information. That is, during screen-off display of the notification message, a content element corresponding to the message type of the notification message may be acquired and displayed straightforwardly, without the need for the AP of the intelligent terminal to do real-time plotting according to the notification message, thereby reducing power consumption.

A module of the device according to the embodiment may execute an operation in a mode elaborated in an embodiment of the method, which will not be repeated here.

Figure 5:
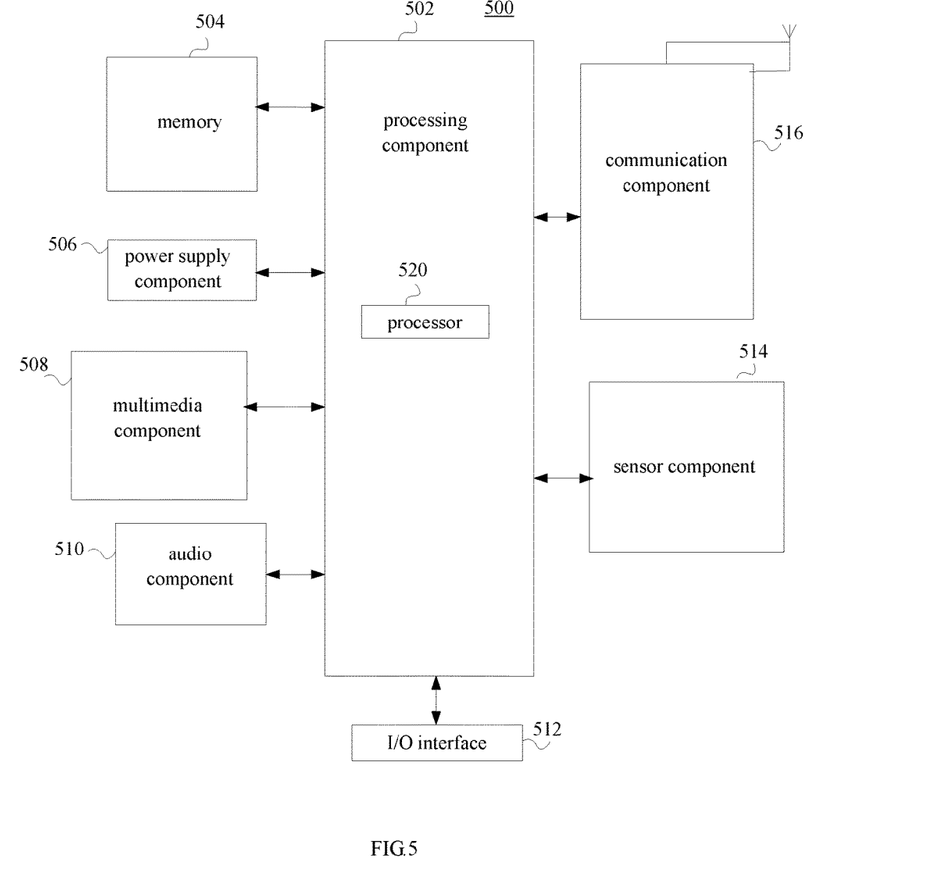
FIG. 5 is a block diagram of a device for screen-off display according to an exemplary embodiment herein.

FIG. 5 is a block diagram of a device 500 for screen-off display according to an exemplary embodiment. For example, the device 500 may be a mobile phone, a computer, a digital broadcasting terminal or UE, a message transceiver, a game console, tablet equipment, medical equipment, fitness equipment, a personal digital assistant, and/or the like.

Referring to FIG. 5, the device 500 may include one or more components as follows: a processing component 502, a memory 504, a power supply component 506, a multimedia component 508, an audio component 510, an Input/Output (I/O) interface 512, a sensor component 514, and a communication component 516.

The processing component 502 generally controls an overall operation of the device 500, such as operations associated with display, a telephone call, data communication, a camera operation, and a recording operation. The processing component 502 may include one or more processors 520 to execute instructions so as to complete all or some steps of the method. In addition, the processing component 502 may include one or more modules to facilitate interaction between the processing component 502 and other components. For example, the processing component 502 may include a multimedia module to facilitate interaction between the multimedia component 508 and the processing component 502.

The memory 504 may be configured to store various types of data to support the operation at the device 500. Example of such data may include instructions of any application or method configured to operate on the device 500, contact data, phonebook data, messages, pictures, videos, and/or the like. The memory 504 may be realized by any type of transitory or non-transitory storage equipment or combination thereof, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic memory, flash memory, magnetic disk, or compact disk.

The power supply component 506 may supply electric power to various components of the device 500. The power supply component 506 may include a power management system, one or more power sources, and other components related to generating, managing and distributing electricity for the device 500.

The multimedia component 508 may include a screen providing an output interface between the device 500 and a user. In some embodiments, the screen may include a Liquid Crystal Display (LCD) and a Touch Panel (TP). If the screen includes a TP, the screen may be realized as a touch screen to receive an input signal from a user. The TP may include one or more touch sensors for sensing touch, slide and gestures on the TP. The touch sensors not only may sense the boundary of a touch or slide move, but also detect the duration and pressure related to the touch or slide move. In some embodiments, the multimedia component 508 may include a front camera and/or a rear camera. When the device 500 is in an operation mode such as a shooting mode or a video mode, the front camera and/or the rear camera may receive external multimedia data. Each of the front camera and the rear camera may be a fixed optical lens system or may have a focal length and be capable of optical zooming.

The audio component 510 may be configured to output and/or input an audio signal. For example, the audio component 510 may include a microphone (MIC). When the device 500 is in an operation mode such as a call mode, a recording mode, and a voice recognition mode, the MIC may be configured to receive an external audio signal. The received audio signal may be further stored in the memory 504 or may be sent via the communication component 516.

In some embodiments, the audio component 510 may further include a loudspeaker configured to output the audio signal.

The I/O interface 512 may provide an interface between the processing component 502 and a peripheral interface module. Such a peripheral interface module may be a keypad, a click wheel, a button, and/or the like. Such a button may include but is not limited to at least one of: a homepage button, a volume button, a start button, and a lock button.

The sensor component 514 may include one or more sensors for assessing various states of the device 500. For example, the sensor component 514 may detect an on/off state of the device 500 and relative positioning of components such as the display and the keypad of the device 500. The sensor component 514 may further detect a change in the position of the device 500 or of a component of the device 500, whether there is contact between the device 500 and a user, the orientation or acceleration/deceleration of the device 500, and/or a change in the temperature of the device 500. The sensor component 514 may include a proximity sensor configured to detect existence of a nearby object without physical contact. The sensor component 514 may further include an optical sensor such as a Complementary Metal-Oxide-Semiconductor (CMOS) or Charge-Coupled-Device (CCD) image sensor used in an imaging application. In some embodiments, the sensor component 514 may further include an acceleration sensor, a gyroscope sensor, a magnetic sensor, a pressure sensor, and/or a temperature sensor.

The communication component 516 may be configured to facilitate wired or wireless communication between the device 500 and other equipment. The device 500 may access a wireless network based on a communication standard such as WiFi, 2G or 3G, or combination thereof. In an exemplary embodiment, the communication component 516 may receive a broadcast signal or broadcast related information from an external broadcast management system via a broadcast channel. In an exemplary embodiment, the communication component 516 may further include a Near Field Communication (NFC) module for short-range communication. For example, the NFC module may be based on Radio Frequency Identification (RFID), Infrared Data Association (IrDA), Ultra-Wideband (UWB) technology, Bluetooth (BT), and/or other technologies.

In an exemplary embodiment, the device 500 may be realized by one or more of Application Specific Integrated Circuits (ASIC), Digital Signal Processors (DSP), Digital Signal Processing Device (DSPD), Programmable Logic Devices (PLD), Field Programmable Gate Arrays (FPGA), controllers, microcontrollers, microprocessors and/or other electronic components, to implement the method according to embodiments in FIGS. 2 and 3.

In an exemplary embodiment, a non-transitory computer-readable storage medium including instructions, such as a memory 504 including instructions, may be provided. The instructions may be executed by the processor 520 of the device 500 to implement the method. For example, the non-transitory computer-readable storage medium may be a Read-Only Memory (ROM), a Compact Disc Read-Only Memory (CD-ROM), a magnetic tape, a floppy disk, optical data storage equipment, and/or the like.

A non-transitory computer-readable storage medium includes instructions which when executed by a processor of an intelligent terminal, enable the intelligent terminal to execute a method for screen-off display. The method includes:

acquiring a content element for screen-off display and format information corresponding to information content to be displayed via screen-off display;

acquiring a reference time, wherein the reference time refers to a system time acquired by an Application Processor (AP) at turnoff of a screen; and displaying the information content via screen-off display according to the reference time, the format information, and the content element for screen-off display.

The information content may be displayed via screen-off display according to the reference time, the format information, and the content element for screen-off display, by:

acquiring a time duration elapsed since the acquisition of the reference time, by starting timing at the acquisition of the reference time;

acquiring an instant system time as a sum of the reference time and the time duration elapsed since the acquisition of the reference time; and displaying the instant system time via screen-off display according to the format information and the content element for screen-off display.

The instant system time may be displayed via screen-off display according to the format information and the content element for screen-off display, by:

acquiring, from the content element for screen-off display, a content element corresponding to the instant system time; and displaying the content element corresponding to the instant system time according to the format information.

The method may further include: after acquiring the reference time, acquiring a system time acquired by the AP at a preset interval; and updating the reference time with the acquired system time, and restarting timing at the update of the reference time.

The information content may be displayed via screen-off display according to the reference time, the format information, and the content element for screen-off display, by:

in response to receiving a notification message prompting reception of new information, determining a message type of the notification message;

acquiring, from the content element for screen-off display, a content element corresponding to the message type of the notification message; and displaying the notification message via screen-off display according to the reference time, the format information, and the content element corresponding to the message type of the notification message.

The notification message may be displayed via screen-off display according to the reference time, the format information, and the content element corresponding to the message type of the notification message, by:

determining a receipt time of receiving the notification message according to the reference time; and displaying message content of the notification message and the receipt time of receiving the notification message via screen-off display according to the format information and the content element corresponding to the message type of the notification message.

In the embodiment herein, the DDIC of an intelligent terminal may acquire a content element for screen-off display and format information corresponding to information content to be displayed via screen-off display, as is preset, as well as an accurate reference time acquired by the AP at turnoff of the screen. Thus, after the screen of the intelligent terminal goes off, the DDIC may perform timing using the crystal oscillator thereof and compute the instant system time, without the need to awaken the AP every minute to acquire the instant system time, reducing system power consumption. Having computed the instant system time, the DDIC may determine, from any acquired content element, any content element required for display and perform display according to the any determined content element and the format information. The intelligent terminal does not have to awaken the AP to do real-time plotting, further reducing the system power consumption.

Other embodiments herein will be apparent to those skilled in the art from consideration of the present disclosure and practice of the invention disclosed here. This application is intended to cover any variation, use, or adaptation of the present disclosure following the general principle herein and including such departures from the present disclosure as come within known or customary practice in the art. The present disclosure and its embodiments are intended to be exemplary only, with a true scope and spirit of the present disclosure being indicated by the appended claims.

Note that the present disclosure is not limited to the exact construction that has been described above and illustrated in the accompanying drawings, and that various modifications and changes can be made without departing from the scope thereof. It is intended that the scope of the present disclosure be limited only by the appended claims.

What is claimed is:

1. A method for screen-off display, comprising:
   acquiring a content element for screen-off display and format information corresponding to information content to be displayed via screen-off display;
   acquiring a reference time, wherein the reference time refers to a system time acquired and output by an Application Processor (AP) at turnoff of a screen; and
   displaying the information content via screen-off display according to the reference time, the format information, and the content element for screen-off display,
   wherein the displaying the information content via screen-off display comprises displaying, while the screen is off, the information content by keeping part of the screen on,
   wherein the information content comprises a notification message,
   wherein the content element for screen-off display comprises a notifying icon for notifying of at least one of a phone call, a short message, or a common application,
   wherein the content element for screen-off display comprises original picture data with redundant data removed,
   wherein the acquiring a content element for screen-off display and format information corresponding to information content to be displayed via screen-off display comprises:
      acquiring the information content to be displayed via screen-off display selected by a user; acquiring the format information set by the user or by default; determining the content element for screen-off display according to the information content selected by the user, or acquiring the content element for screen-off display as any content element by default; compressing the format information and the content element for screen-off display, and upon detecting activation of screen-off display, storing, in a Display Driver Integrated Circuit (DDIC) or a Touch Display Driver Integration (TDDI), the content element for screen-off display and the format information corresponding to the information content to be displayed via screen-off display which have been compressed,
wherein the displaying the information content via screen-off display according to the reference time, the format information, and the content element for screen-off display comprises: in response to receiving the notification message prompting reception of new information,
determining a message type of the notification message;
acquiring a receipt time of receiving the notification message by determining a time duration elapsed since the acquisition of the reference time till reception of the notification message and adding the time duration elapsed to the reference time;
acquiring, from any stored content element stored in the DDIC or the TDDI according to the message type of the notification message, a notifying icon corresponding to the notification message;
displaying, according to the format information, the receipt time of receiving the notification message, message content of the notification message, and the notifying icon corresponding to the notification message.

2. The method of claim 1, wherein the information content further comprises time, wherein the content element for screen-off display further comprises at least one of a-z, A-Z, day, date, month, or year, wherein the displaying the information content via screen-off display according to the reference time, the format information, and the content element for screen-off display comprises:
acquiring a time duration elapsed since the acquisition of the reference time, by starting timing at the acquisition of the reference time;
acquiring an instant system time as a sum of the reference time and the time duration elapsed since the acquisition of the reference time; and
displaying the instant system time via screen-off display according to the format information and the content element for screen-off display.

3. The method of claim 2, wherein the displaying the instant system time via screen-off display according to the format information and the content element for screen-off display comprises:
acquiring, from the any stored content element, any content element required for displaying the instant system time; and
displaying the any content element required for displaying the instant system time according to the format information.

4. The method of claim 3, further comprising: after acquiring the reference time,
acquiring the system time acquired by the AP at a preset interval; and
updating the reference time with the acquired system time, and restarting timing at the update of the reference time.

5. The method of claim 2, further comprising: after acquiring the reference time,
acquiring the system time acquired by the AP at a preset interval; and
updating the reference time with the acquired system time, and restarting timing at the update of the reference time.

6. A device for screen-off display, comprising:
a processor; and
a memory for storing instructions executable for the processor,
wherein the processor is configured for:
acquiring a content element for screen-off display and format information corresponding to information content to be displayed via screen-off display;
acquiring a reference time, wherein the reference time refers to a system time acquired and output by an Application Processor (AP) at turnoff of a screen; and
displaying the information content via screen-off display according to the reference time, the format information, and the content element for screen-off display,
wherein the displaying the information content via screen-off display comprises displaying, while the screen is off, the information content by keeping part of the screen on,
wherein the information content comprises a notification message,
wherein the content element for screen-off display comprises a notifying icon for notifying of at least one of a phone call, a short message, or a common application,
wherein the content element for screen-off display comprises original picture data with redundant data removed,
wherein the acquiring a content element for screen-off display and format information corresponding to information content to be displayed via screen-off display comprises:
acquiring the information content to be displayed via screen-off display selected by a user; acquiring the format information set by the user or by default; determining the content element for screen-off display according to the information content selected by the user, or acquiring the content element for screen-off display as any content element by default; compressing the format information and the content element for screen-off display, and upon detecting activation of screen-off display, storing, in a Display Driver Integrated Circuit (DDIC) or a Touch Display Driver Integration (TDDI), the content element for screen-off display and the format information corresponding to the information content to be displayed via screen-off display which have been compressed,
wherein the displaying the information content via screen-off display according to the reference time, the format information, and the content element for screen-off display comprises: in response to receiving the notification message prompting reception of new information,
determining a message type of the notification message;
acquiring a receipt time of receiving the notification message by determining a time duration elapsed since the acquisition of the reference time till reception of the notification message and adding the time duration elapsed to the reference time;
acquiring, from any stored content element stored in the DDIC or the TDDI according to the message type of the notification message, a notifying icon corresponding to the notification message;
displaying, according to the format information, the receipt time of receiving the notification message, message content of the notification message, and the notifying icon corresponding to the notification message.

7. The device of claim 6, wherein the information content further comprises time, wherein the content element for screen-off display further comprises at least one of a-z, A-Z, day, date, month, or year, wherein the displaying the information content via screen-off display according to the reference time, the format information, and the content element for screen-off display comprises:
　acquiring a time duration elapsed since the acquisition of the reference time, by starting timing at the acquisition of the reference time;
　acquiring an instant system time as a sum of the reference time and the time duration elapsed since the acquisition of the reference time; and
　displaying the instant system time via screen-off display according to the format information and the content element for screen-off display.

8. The device of claim 7, wherein the displaying the instant system time via screen-off display according to the format information and the content element for screen-off display comprises:
　acquiring, from the any stored content element, any content element required for displaying the instant system time; and
　displaying the any content element required for displaying the instant system time according to the format information.

9. The device of claim 8, wherein the processor is further configured for: after acquiring the reference time,
　acquiring the system time acquired by the AP at a preset interval; and
　updating the reference time with the acquired system time, and restarting timing at the update of the reference time.

10. The device of claim 7, wherein the processor is further configured for: after acquiring the reference time,
　acquiring the system time acquired by the AP at a preset interval; and
　updating the reference time with the acquired system time, and restarting timing at the update of the reference time.

11. A non-transitory computer-readable storage medium having stored therein instructions that when executed by a processor, causes the processor to perform a method for screen-off display, the method comprising:
　acquiring a content element for screen-off display and format information corresponding to information content to be displayed via screen-off display;
　acquiring a reference time, wherein the reference time refers to a system time acquired and output by an Application Processor (AP) at turnoff of a screen; and
　displaying the information content via screen-off display according to the reference time, the format information, and the content element for screen-off display,
　wherein the displaying the information content via screen-off display comprises displaying, while the screen is off, the information content by keeping part of the screen on,
　wherein the information content comprises a notification message,
　wherein the content element for screen-off display comprises a notifying icon for notifying of at least one of a phone call, a short message, or a common application,
　wherein the content element for screen-off display comprises original picture data with redundant data removed,
　wherein the acquiring a content element for screen-off display and format information corresponding to information content to be displayed via screen-off display comprises:
　　acquiring the information content to be displayed via screen-off display selected by a user; acquiring the format information set by the user or by default; determining the content element for screen-off display according to the information content selected by the user, or acquiring the content element for screen-off display as any content element by default; compressing the format information and the content element for screen-off display, and upon detecting activation of screen-off display, storing, in a Display Driver Integrated Circuit (DDIC) or a Touch Display Driver Integration (TDDI), the content element for screen-off display and the format information corresponding to the information content to be displayed via screen-off display which have been compressed,
　wherein the displaying the information content via screen-off display according to the reference time, the format information, and the content element for screen-off display comprises: in response to receiving the notification message prompting reception of new information,
　　determining a message type of the notification message;
　　acquiring a receipt time of receiving the notification message by determining a time duration elapsed since the acquisition of the reference time till reception of the notification message and adding the time duration elapsed to the reference time;
　　acquiring, from any stored content element stored in the DDIC or the TDDI according to the message type of the notification message, a notifying icon corresponding to the notification message;
　　displaying, according to the format information, the receipt time of receiving the notification message, message content of the notification message, and the notifying icon corresponding to the notification message.

12. The storage medium of claim 11, wherein the information content further comprises time, wherein the content element for screen-off display further comprises at least one of a-z, A-Z, day, date, month, or year, wherein the displaying the information content via screen-off display according to the reference time, the format information, and the content element for screen-off display comprises:
　acquiring a time duration elapsed since the acquisition of the reference time, by starting timing at the acquisition of the reference time;
　acquiring an instant system time as a sum of the reference time and the time duration elapsed since the acquisition of the reference time; and
　displaying the instant system time via screen-off display according to the format information and the content element for screen-off display.

13. The storage medium of claim 12, wherein the displaying the instant system time via screen-off display according to the format information and the content element for screen-off display comprises:
　acquiring, from the any stored content element, any content element required for displaying the instant system time; and
　displaying the any content element required for displaying the instant system time according to the format information.

14. The storage medium of claim 12, wherein the method further comprises: after acquiring the reference time,
　acquiring the system time acquired by the AP at a preset interval; and updating the reference time with the acquired system time, and restarting timing at the update of the reference time.

\* \* \* \* \*